US011401589B2

(12) United States Patent
Zaizen et al.

(10) Patent No.: US 11,401,589 B2
(45) Date of Patent: *Aug. 2, 2022

(54) MULTILAYER ELECTRICAL STEEL SHEET

(71) Applicant: JFE STEEL CORPORATION, Tokyo (JP)

(72) Inventors: Yoshiaki Zaizen, Tokyo (JP); Yoshihiko Oda, Tokyo (JP); Tatsuhiko Hiratani, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 70 days.

This patent is subject to a terminal disclaimer.

(21) Appl. No.: 16/770,617

(22) PCT Filed: Dec. 10, 2018

(86) PCT No.: PCT/JP2018/045357
§ 371 (c)(1),
(2) Date: Jun. 8, 2020

(87) PCT Pub. No.: WO2019/117096
PCT Pub. Date: Jun. 20, 2019

(65) Prior Publication Data
US 2020/0308676 A1     Oct. 1, 2020

(30) Foreign Application Priority Data
Dec. 12, 2017  (JP) .............................. JP2017-238063

(51) Int. Cl.
*C22C 38/02*      (2006.01)
*C22C 38/00*      (2006.01)
(Continued)

(52) U.S. Cl.
CPC ............ *C22C 38/02* (2013.01); *C22C 38/002* (2013.01); *C22C 38/008* (2013.01); *C22C 38/06* (2013.01);
(Continued)

(58) Field of Classification Search
None
See application file for complete search history.

(56) References Cited

U.S. PATENT DOCUMENTS 5,993,568 A * 11/1999 Takada ................. C21D 8/1277
  148/304
7,998,284 B2   8/2011 Takeda et al.
(Continued)

FOREIGN PATENT DOCUMENTS

CA     2992966 A1    3/2017
CN   101202474 A     6/2008
(Continued)

OTHER PUBLICATIONS

Machine translation of JP 2013-159823 from worldwide.espacenet.com translated Oct. 15, 2021 (Year: 2013).*
(Continued)

*Primary Examiner* — Elizabeth Collister
(74) *Attorney, Agent, or Firm* — Kenja IP Law PC

(57) ABSTRACT

Provided is a multilayer electrical steel sheet having both low high-frequency iron loss and high magnetic flux density. The multilayer electrical steel sheet has an inner layer and surface layers provided on both sides of the inner layer, in which the surface layers and the inner layer have a predetermined chemical composition, the multilayer electrical steel sheet having: $\Delta Si$ of 0.5 mass % to 4.0 mass %; $\Delta Al$ of 0.05 mass % or less; a ratio of $t_1$ to t represented by $t_1/t$ of from 0.10 to 0.70; a magnetic flux density $B_{10}$ of 1.3 T or more; and a ratio of $B_1$ to $B_{10}$ represented by $B_1/B_{10}$ of 0.45

(Continued)

or more; and an iron loss $W_{10/1k}$ in W/kg and the sheet thickness t in mm satisfy the following formula (1):

$$W_{10/1k} \leq 15+140 \times t \quad (1).$$

2 Claims, 5 Drawing Sheets

(51) Int. Cl.
  *C22C 38/06* (2006.01)
  *C22C 38/12* (2006.01)
(52) U.S. Cl.
  CPC .......... *C22C 38/12* (2013.01); *C22C 2202/02* (2013.01); *C22C 2204/00* (2013.01)

(56) References Cited

U.S. PATENT DOCUMENTS

| | | | |
|---|---|---|---|
| 10,584,406 B2 | 3/2020 | Imamura et al. | |
| 2002/0134466 A1 | 9/2002 | Namikawa et al. | |
| 2006/0243351 A1 | 11/2006 | Ohashi et al. | |
| 2008/0136285 A1 | 6/2008 | Tajima et al. | |
| 2015/0013850 A1* | 1/2015 | Imamura | C22C 38/60 148/309 |
| 2019/0112697 A1* | 4/2019 | Hiratani | C21D 1/74 |

FOREIGN PATENT DOCUMENTS

| | | |
|---|---|---|
| CN | 101443479 A | 5/2009 |
| CN | 101821418 A | 9/2010 |
| CN | 102650014 A | 8/2012 |
| CN | 104053804 A | 9/2014 |
| JP | H04246157 A | 9/1992 |
| JP | H05195169 A | 8/1993 |
| JP | H08165520 A | 6/1996 |
| JP | H11293415 A | 10/1999 |
| JP | H11293422 A | 10/1999 |
| JP | 2001003145 A | 1/2001 |
| JP | 2010063252 A | 3/2010 |
| JP | 2010132938 A * | 6/2010 |
| JP | 2013159823 A | 8/2013 |
| JP | 2014196539 A | 10/2014 |
| WO | 2017170749 A1 | 10/2017 |

OTHER PUBLICATIONS

Machine translation of JP 2010132938 A; translated via Espacenet Apr. 6, 2022 (Year: 2010).*
Jul. 5, 2021, Office Action issued by the Canadian Intellectual Property Office in the corresponding Canadian Patent Application No. 3,084,975.
Aug. 20, 2020, the Extended European Search Report issued by the European Patent Office in the corresponding European Patent Application No. 18888348.2.
May 11, 2021, Office Action issued by the China National Intellectual Property Administration in the corresponding Chinese Patent Application No. 201880079793.7 with English language search report.
Feb. 12, 2019, International Search Report issued in the International Patent Application No. PCT/JP2018/045357.
Oct. 27, 2021, Office Action issued by the Korean Intellectual Property Office in the corresponding Korean Patent Application No. 10-2020-7019447 with English language concise statement of relevance.

* cited by examiner

MULTILAYER ELECTRICAL STEEL SHEET

TECHNICAL FIELD

This disclosure relates to a multilayer electrical steel sheet, and in particular, a multilayer electrical steel sheet having both low high-frequency iron loss and high magnetic flux density.

BACKGROUND

Motors for hybrid electric vehicles and cleaners are driven in a high-frequency region such as 400 Hz to 2 kHz from the viewpoint of reducing the size and achieving high efficiency. Therefore, for non-oriented electrical steel sheets used for core materials of such motors, electrical steel sheets having low high-frequency iron loss and high magnetic flux density are demanded.

To reduce the high-frequency iron loss, it is effective to increase specific resistance. Therefore, high-Si steel having increased specific resistance through the increase in the Si content has been developed. However, since Si is a non-magnetic element, the increase in the Si content leads to lower saturation magnetization.

Therefore, as means for achieving both high-frequency iron loss reduction and high magnetic flux density, gradient Si magnetic materials having controlled Si concentration gradient in a thickness direction of electrical steel sheets have been developed. For example, JP H11-293422 A (PTL 1) proposes an electrical steel sheet having a Si concentration gradient in a thickness direction in which the Si concentration in a surface of the steel sheet is higher than that of a mid-thickness part of the steel sheet. Specifically, the electrical steel sheet has a mid-thickness part with a Si concentration of 3.4% or more while having, on its both surfaces, surface layers with a Si concentration of 5 mass % to 8 mass %. Further, the thickness of the surface layers is 10% or more of the sheet thickness.

CITATION LIST

Patent Literature

PTL 1: JP H11-293422 A

SUMMARY

Technical Problem

However, when conventional gradient Si magnetic materials as proposed in PTL 1 are used as the iron core materials of electric appliances whose highest frequency is several kHz, the hysteresis loss is high and thus the iron loss is not sufficiently reduced.

It could thus be helpful to provide a multilayer electrical steel sheet having both low high-frequency iron loss and high magnetic flux density.

Solution to Problem

The inventors made intensive studies of a method of solving the problem, and as a result, found that in order to reduce high-frequency iron loss, it is important to suitably control the difference in Si concentration between surface layers and an inner layer of a steel sheet and add at least one selected from the group consisting of P, Sn, and Sb. This disclosure is based on the above finding and has the following primary features.

1. A multilayer electrical steel sheet comprising an inner layer and surface layers provided on both sides of the inner layer, wherein each of the surface layers has a chemical composition containing (consisting of), in mass %, Si: 2.5% to 6.0% and at least one selected from the group consisting of P: 0.01% to 0.1%, Sn: 0.001% to 0.1% and Sb: 0.001% to 0.1%, with the balance being Fe and inevitable impurities, the inner layer has a chemical composition containing (consisting of), in mass %, Si: 1.5% to 5.0% and at least one selected from the group consisting of P: 0.01% to 0.1%, Sn: 0.001% to 0.1% and Sb: 0.001% to 0.1%, with the balance being Fe and inevitable impurities, and the multilayer electrical steel sheet has:

$\Delta$Si of 0.5 mass % to 4.0 mass %, $\Delta$Si being defined as a difference between a Si content in each of the surface layers $[Si]_1$ and a Si content in the inner layer $[Si]_0$ represented by $[Si]_1-[Si]_0$;

$\Delta$Al of 0.05 mass % or less, $\Delta$Al being defined as an absolute value of a difference between a content of Al contained as an inevitable impurity in each of the surface layers $[Al]_1$ and a content of Al contained as an inevitable impurity in the inner layer $[Al]_0$ represented by $|[Al]_1-[Al]_0|$;

a ratio of $t_1$ to t represented by $t_1/t$ of from 0.10 to 0.70, where $t_1$ denotes a total thickness of the surface layers and t denotes a sheet thickness of the multilayer electric steel sheet;

$B_{10}$ of 1.3 T or more, where $B_{10}$ denotes a magnetic flux density at a magnetic field intensity of 1000 A/m;

a ratio of $B_1$ to $B_{10}$ represented by $B_1/B_{10}$ of 0.45 or more, where $B_1$ denotes a magnetic flux density at a magnetic field intensity of 100 A/m; and an iron loss at a frequency of 1 kHz and a largest magnetic flux density of 1.0 T represented by $W_{10/1k}$ in W/kg and the sheet thickness t in mm satisfy the following formula (1):

$$W_{10/1k} \leq 15 + 140 \times t \qquad (1).$$

2. The multilayer electrical steel sheet according to 1, wherein at least one of the chemical composition of each of the surface layers or the chemical composition of the inner layer further contains, in mass %, Mo: 0.001% to 0.1%.

Advantageous Effect

According to this disclosure, it is possible to provide a multilayer electrical steel sheet having both low high-frequency iron loss and high magnetic flux density.

DETAILED DESCRIPTION

Detailed description is given below. The following description merely presents examples of preferred embodiments of this disclosure, and this disclosure is not limited to these embodiments.

[Multilayer Electrical Steel Sheet]

Figure 1:
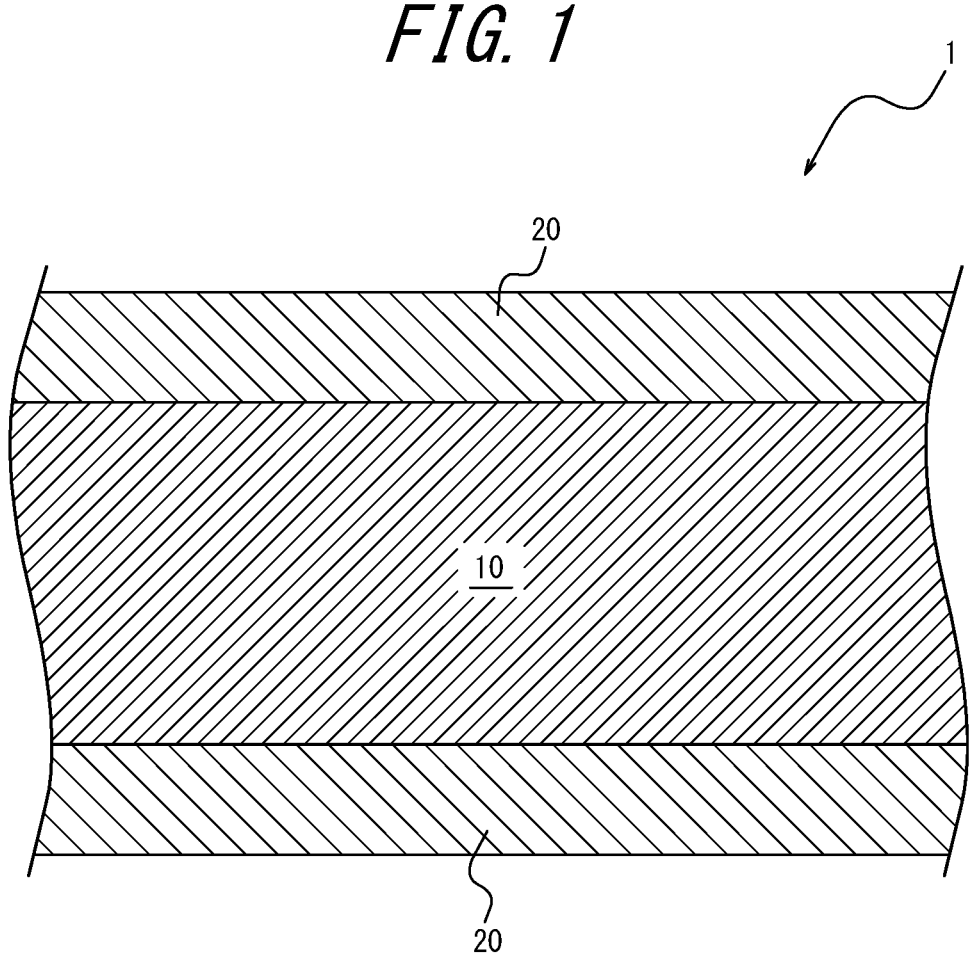
FIG. 1 is a schematic diagram illustrating the structure of a multilayer electrical steel sheet according to one of the embodiments of this disclosure.
Figure 2A:
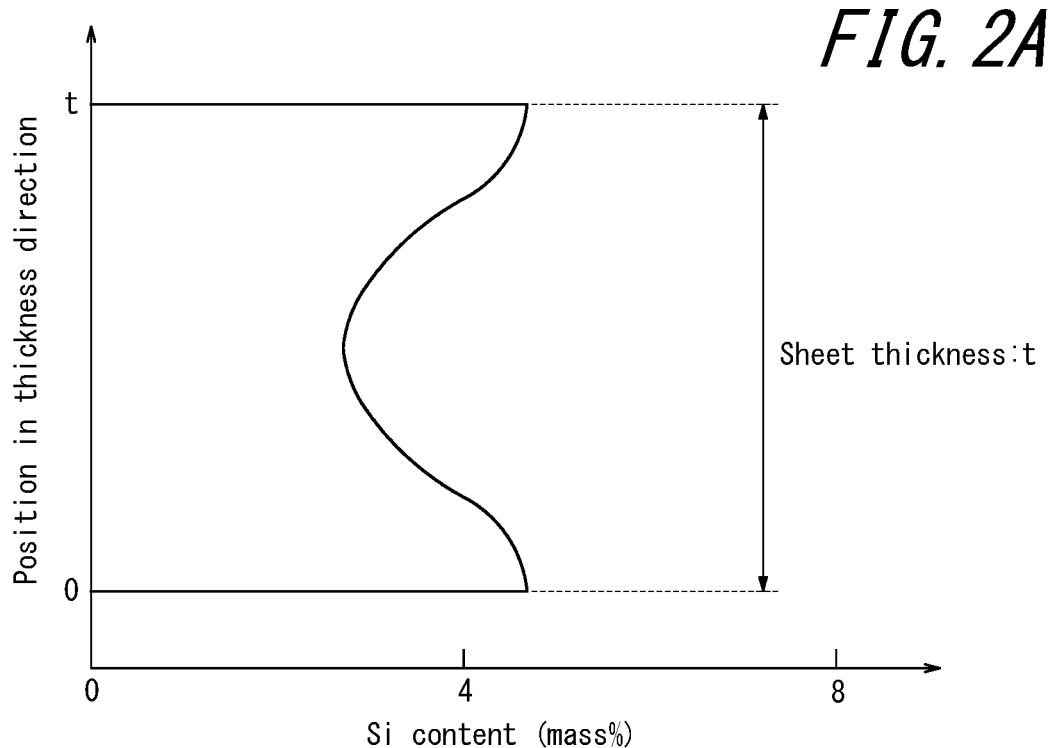
FIGS. 2A and 2B are schematic diagrams illustrating examples of the Si content profile in a thickness direction of the multilayer electrical steel sheet.
Figure 2B:
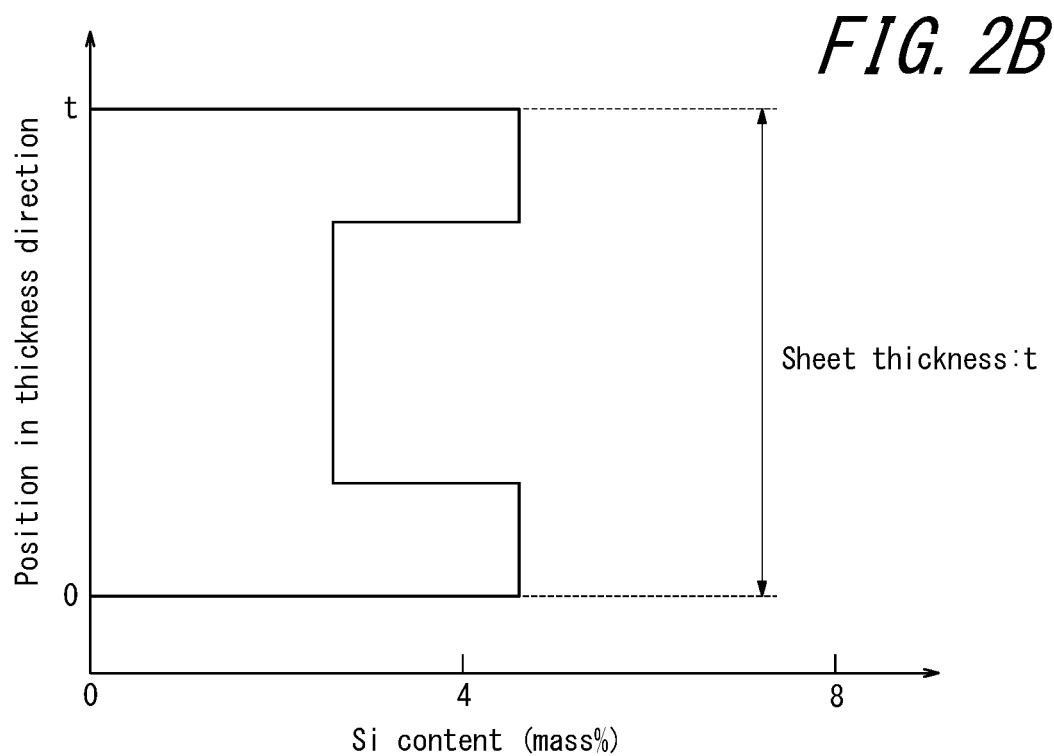

FIG. 1 is a schematic diagram illustrating the structure of a multilayer electrical steel sheet according to one of the embodiments of this disclosure. Further, FIGS. 2A and 2B are schematic diagrams illustrating examples of the Si content profile in a thickness direction of the multilayer electrical steel sheet. In FIGS. 2A and 2B, the vertical axis indicates a position in the thickness direction, 0 denotes one surface of the multilayer electrical steel sheet, and t denotes the other surface of the multilayer electrical steel sheet.

As illustrated in FIG. 1, a multilayer electrical steel sheet 1 of this disclosure (hereinafter, also referred to simply as "steel sheet") has an inner layer 10 and surface layers 20 provided on both sides of the inner layer 10, the inner layer 10 and the surface layers 20 having different Si contents. The Si content may change continuously (FIG. 2A) or stepwise (FIG. 2B) in the thickness direction of the steel sheet. When the Si content changes stepwise, it may change in two or more steps. In the following description, the "surface layers" indicate surface layers provided on the surfaces of both sides of the multilayer electrical steel sheet. Therefore, in this disclosure, both a first surface layer provided on one surface of the multilayer electrical steel sheet and a second surface layer provided on the other surface of the multilayer electrical steel sheet satisfy the conditions described below.

A part having a higher Si content than an average of Si contents over the total sheet thickness of the steel sheet is defined as a "surface layer" and a part having a lower Si content than the average is defined as an "inner layer". As described below, when the multilayer electrical steel sheet is manufactured by cladding two types of steel materials having different Si contents (high Si material and low Si material) with each other, typically, a part made of the high Si material is a surface layer and a part made of the low Si material is an inner layer. In this case, the Si content in each of the surface layers is substantially constant and the Si content in the inner layer is also substantially constant.

[Chemical Composition]

First, the chemical compositions of each of the surface layers and the inner layer are described. When components are expressed in "%", this refers to "mass %" unless otherwise stated.

[Chemical Composition of Surface Layer]

First, the chemical composition of each of the surface layers will be described. In this disclosure, both the first surface layer provided on one surface of the multilayer electrical steel sheet and the second surface layer provided on the other surface of the multilayer electrical steel sheet have the chemical composition described below. The chemical composition of the first surface layer and the chemical composition of the second surface layer may be typically the same but may be different from each other. Further, the content of an element in each of the surface layers indicates an average content of the element in each surface layer.

Si: 2.5% to 6.0%

Si is an element having an effect of increasing the electrical resistance of the steel sheet and reducing eddy current loss. When the Si content in each of the surface layers ($[Si]_1$) is less than 2.5%, the eddy current loss cannot be effectively reduced. Therefore, the Si content in each of the surface layers is set to 2.5% or more, preferably 3.0% or more, and more preferably more than 3.5%. On the other hand, when the Si content in each of the surface layers is more than 6.0%, the magnetic flux density decreases due to lower saturation magnetization. Therefore, the Si content in each of the surface layers is set to 6.0% or less, preferably less than 5.5%, and more preferably 5.0% or less. As described above, a Si content of 2.5% to 6.0% in each of the surface layers means that the average Si content in the first surface layer is 2.5% to 6.0% and the average Si content in the second surface layer is 2.5% to 6.0%. The average Si content in the first surface layer may be the same with or different from the average Si content in the second surface layer. The same definition applies to other elements.

The chemical composition in each of the surface layers further contains at least one selected from the group consisting of P: 0.01% to 0.1%, Sn: 0.001% to 0.1%, and Sb: 0.001% to 0.1%.

P: 0.01% to 0.1%

The addition of P greatly improves the texture, which makes it possible to improve the magnetic flux density and lower the hysteresis loss. When P is added, to obtain this effect, the P content is set to 0.01% or more. On the other hand, a P content exceeding 0.1% causes saturation of the effect and additionally, lowers the manufacturability and increases the cost. Therefore, the P content is set to 0.1% or less.

Sn: 0.001% to 0.1%

As with P, the addition of Sn greatly improves the texture, which makes it possible to improve the magnetic flux density and lower the hysteresis loss. When Sn is added, to obtain this effect, the Sn content is set to 0.001% or more. On the other hand, a Sn content exceeding 0.1% causes saturation of the effect and additionally, lowers the manufacturability and increases the cost. Therefore, the Sn content is set to 0.1% or less.

Sb: 0.001% to 0.1%

As with P and Sn, the addition of Sb greatly improves the texture, which makes it possible to improve the magnetic flux density and lower the hysteresis loss. When Sb is added, to obtain this effect, the Sb content is set to 0.001% or more. On the other hand, a Sb content exceeding 0.1% causes saturation of the effect and additionally, lowers the manufacturability and increases the cost. Therefore, the Sb content is set to 0.1% or less.

In one embodiment of this disclosure, each of the surface layers has a chemical composition containing the above elements with the balance being Fe and inevitable impurities.

Examples of elements which may be contained as the inevitable impurities in the multilayer electrical steel sheet include Al. When the Al content is limited to 0.1% or less, the magnetic flux density can be further improved. Therefore, the Al content is preferably limited to 0.1% or less.

Further, in another embodiment of this disclosure, the chemical composition of each of the surface layers may further contain Mo in an amount described below.

Mo: 0.001% to 0.1%

Mo is an element having an effect of suppressing the oxidation of the surface layers of the steel sheet to thereby further reduce iron loss. When Mo is added, to obtain this effect, the Mo content is set to 0.001% or more. On the other hand, when the Mo content exceeds 0.1%, carbides are formed, leading to an increase in iron loss. Therefore, the Mo content is set to 0.1% or less.

Each of the surface layers according to one embodiment of this disclosure may have a chemical composition containing, in mass %, Si: 2.5% to 6.0%, at least one selected from the group consisting of P: 0.01% to 0.1%, Sn: 0.001% to 0.1%, and Sb: 0.001% to 0.1%, and optionally, Mo: 0.001% to 0.1%, with the balance being Fe and inevitable impurities.

Further, each of the surface layers according to another embodiment of this disclosure may have a chemical composition containing, in mass %, Si: 2.5% to 6.0%, at least one selected from the group consisting of P: 0.01% to 0.1%, Sn: 0.001% to 0.1%, and Sb: 0.001% to 0.1%, and optionally, Mo: 0.001% to 0.1%, with the balance being Fe and inevitable impurities.

[Chemical Composition of Inner Layer]

Next, the chemical composition of the inner layer will be described. The content of an element in the inner layer indicates an average content of the element in the inner surface.

Si: 1.5% to 5.0%

A Si content in the inner layer ($[Si]_0$) of less than 1.5% causes an increase in high-frequency iron loss. Therefore, the Si content of the inner layer is set to 1.5% or more. On the other hand, a Si content in the inner layer of more than 5.0% causes cracking of a motor core in punching the core. Therefore, the Si content in the inner layer is set to 5.0% or less. The Si content in the inner layer is preferably set to 4.0% or less and more preferably 2.8% or less.

The chemical composition in the inner layer further contains at least one selected from the group consisting of P: 0.01% to 0.1%, Sn: 0.001% to 0.1%, and Sb: 0.001% to 0.1%.

P: 0.01% to 0.1%

The addition of P greatly improves the texture, which makes it possible to improve the magnetic flux density and lower the hysteresis loss. When P is added, to obtain this effect, the P content is set to 0.01% or more. On the other hand, a P content exceeding 0.1% causes saturation of the effect and additionally, lowers the manufacturability and increases the cost. Therefore, the P content is set to 0.1% or less.

Sn: 0.001% to 0.1%

As with P, the addition of Sn greatly improves the texture, which makes it possible to improve the magnetic flux density and lower the hysteresis loss. When Sn is added, to obtain this effect, the Sn content is set to 0.001% or more. On the other hand, a Sn content exceeding 0.1% causes saturation of the effect and additionally, lowers the manufacturability and increases the cost. Therefore, the Sn content is set to 0.1% or less.

Sb: 0.001% to 0.1%

As with P and Sn, the addition of Sb greatly improves the texture, which makes it possible to improve the magnetic flux density and lower the hysteresis loss. When Sb is added, to obtain this effect, the Sb content is set to 0.001% or more. On the other hand, a Sb content exceeding 0.1% causes saturation of the effect and additionally, lowers the manufacturability and increases the cost. Therefore, the Sb content is set to 0.1% or less.

In one embodiment of this disclosure, the inner layer has a chemical composition containing the above elements with the balance being Fe and inevitable impurities.

Examples of elements which can be contained as the inevitable impurities in the multilayer electrical steel sheet include Al. When the Al content is limited to 0.1% or less, the magnetic flux density can be further improved. Therefore, the Al content is preferably limited to 0.1% or less.

Further, in another embodiment of this disclosure, the chemical composition of the inner layer may further contain Mo in an amount described below.

Mo: 0.001% to 0.1%

As described above, Mo is an element having an effect of suppressing the oxidation of the surface layers of the steel sheet to thereby further reduce iron loss. To prevent the oxidation, it suffices that Mo exists in the surface layers of the steel sheet, but Mo may be added to the inner layer. For example, when the multilayer electrical steel sheet is manufactured by a siliconizing treatment as described below, in order to add Mo to the surface layers, it suffices to add Mo to the entire steel sheet and in this case, Mo also exists in the inner layer. Further, even the multilayer electrical steel sheet is manufactured by a method other than the siliconizing treatment, Mo may be added to the inner layer. From the viewpoint of manufacture, when Mo is added to the inner layer, the Mo content in the inner layer is set to 0.001% or more as with the Mo content in each of the surface layers. On the other hand, when the Mo content exceeds 0.1%, carbides are formed, leading to an increase in iron loss. Therefore, the Mo content is set to 0.1% or less.

The inner layer according to one embodiment of this disclosure may have a chemical composition containing, in mass %, Si: 1.5% to 5.0%, at least one selected from the group consisting of P: 0.01% to 0.1%, Sn: 0.001% to 0.1%, and Sb: 0.001% to 0.1%, and optionally, Mo: 0.001% to 0.1%, with the balance being Fe and inevitable impurities.

Further, the inner layer according to another embodiment of this disclosure may have a chemical composition containing, in mass %, Si: 1.5% to 5.0%, at least one selected from the group consisting of P: 0.01% to 0.1%, Sn: 0.001% to 0.1%, and Sb: 0.001% to 0.1%, and optionally, Mo: 0.001% to 0.1%, with the balance being Fe and inevitable impurities.

[Difference in Si Content]

To examine the effect of the difference in Si content between the surface layers and the inner layer (ΔSi) on the magnetic properties, multilayer electrical steel sheets having different ΔSi were manufactured by the following procedures and the magnetic properties were evaluated.

First, steel for the surface layers was attached to both surfaces of steel for the inner layer so that the ratio of the thickness of the surface layers to the sheet thickness (total thickness) of the multilayer electrical steel sheet was 0.30 and subjected to hot rolling to obtain a hot-rolled steel sheet. Each of the steel for the surface layers and the steel for the inner layer was melted so as to obtain a desired chemical composition to prepare an ingot. The Si content in the inner layer $[Si]_0$ was set to 2.0% and the Si content in each of the surface layers $[Si]_1$ was changed in the range of 2.1% to 6.5%. The Al content was set to 0.001% and the Sn content was set to 0.04% in both the surface layers and the inner layer. The chemical compositions of each of the surface layers and the inner layer had the balance of Fe and inevitable impurities. The surface layers on both surfaces had the same chemical composition.

After the hot rolling, the hot-rolled steel sheet was subjected to hot-rolled sheet annealing of 950° C.×30 s, followed by cold rolling to obtain a cold-rolled steel sheet having a sheet thickness of 0.20 mm. Subsequently, the cold-rolled steel sheet was subjected to final annealing of 1000° C.×30 s to obtain a multilayer electrical steel sheet.

A test piece having a width of 30 mm and a length of 180 mm was collected from the obtained multilayer electrical steel sheet and subjected to the Epstein test to evaluate the magnetic properties. In the Epstein test, an L-direction test piece collected so that the length direction of the test piece was parallel to the rolling direction (L direction) and a C-direction test piece collected so that the length direction of the test piece was parallel to the direction orthogonal to the rolling direction (C direction) were used in equal amounts to measure the averages of the magnetic properties in the L direction and the C direction.

Figure 3:
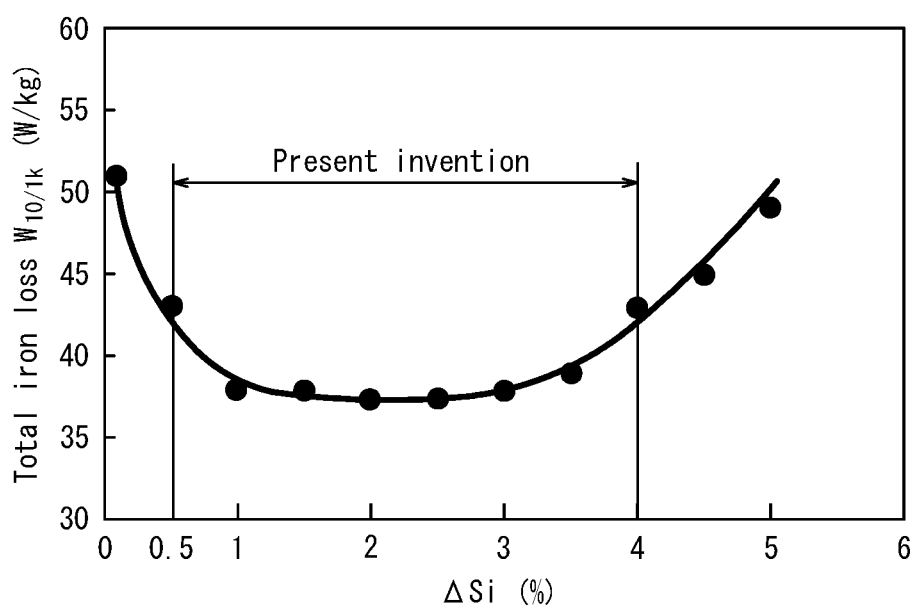
FIG. 3 is a graph illustrating a correlation between the difference in Si content between surface layers and an inner layer (ΔSi) and the total iron loss ($W_{10/1k}$)
Figure 4:
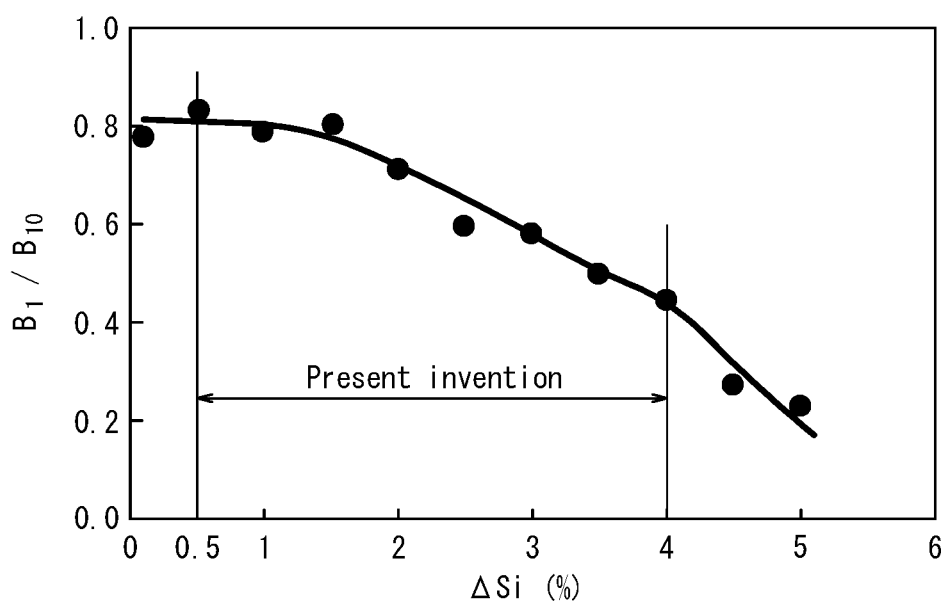
FIG. 4 is a graph illustrating a correlation between the difference in Si content between the surface layers and the inner layer (ΔSi) and the magnetic flux density ratio (B i/$B_{10}$)

FIG. 3 indicates a correlation between ΔSi (mass %) and the total iron loss at 1.0 T and 1 kHz represented by $W_{10/1k}$ (W/kg), ΔSi being defined as a difference in Si content between each of the surface layers and the inner layer ($[Si]_1-[Si]_0$). Further, FIG. 4 indicates a correlation between ΔSi and the magnetic flux density ratio. The "magnetic flux density ratio" indicates the ratio of $B_1$ to $B_{10}$ represented by $B_1/B_{10}$, where $B_1$ denotes a magnetic flux density at a magnetic field intensity of 100 A/m and $B_{10}$ denotes a magnetic flux density at a magnetic field intensity of 1000 A/m.

As can be seen from the results illustrated in FIG. 3, when ΔSi is 0.5 mass % or more and 4.0 mass % or less, the iron loss can be reduced to low. Further, as can be seen from the results illustrated in FIG. 4, when ΔSi exceeds 4.0 mass %, the magnetic flux density ratio is suddenly lowered. This is believed to be because of the following reasons. Specifically, when the Si content in each of the surface layers is higher than that in the inner layer, the magnetic permeability of each of the surface layers is higher than that of the inner layer. As a result, magnetic fluxes concentrate to the surface layer, lowering the eddy current loss. However, when ΔSi is excessively large, the difference in lattice constant and the difference in magnetostriction between each of the surface layers and the inner layer become large. As a result, since the stress applied during the magnetization of the steel sheet is increased, the hysteresis loss increases and the magnetic flux density decreases in low and middle magnetic field ranges.

For the above reasons, in this disclosure, ΔSi defined as a difference between the Si content in each of the surface layers and the Si content in the inner layer ($[Si]_1-[Si]_0$) is set to 0.5 mass % to 4.0 mass %.

[Difference in Al Content]

Although the magnetostriction in the surface layers and the inner layer is strongly influenced by the Si content, it is also influenced by the texture. For example, since the formation of the texture greatly varies during final annealing when the amount of impurities is different between the surface layers and the inner layer, the difference in magnetostriction between the surface layers and the inner layer becomes large. In particular, Al is an element which greatly influences the formation of the texture. Therefore, ΔAl is set to 0.05 mass % or less, where ΔAl is defined as an absolute value of the difference between the content of Al contained as an inevitable impurity in each of the surface layers $[Al]_1$ and the content of Al contained as an inevitable impurity in the inner layer $[Al]_0$ ($|[Al]_1-[Al]_0|$). On the other hand, no lower limit is placed on ΔAl, but ΔAl may be 0.

[Multilayer Ratio]

Next, to examine the effect of the ratio of the total thickness of the surface layers $t_1$ to the sheet thickness of the multilayer electrical steel sheet t (tilt) (hereinafter, also referred to as "multilayer ratio") on the magnetic properties, multilayer electrical steel sheets having different multilayer ratios were manufactured by the following procedures and the magnetic properties were evaluated. The "total thickness of the surface layers" indicates the sum of the thicknesses of the surface layers provided on both sides.

First, steel for the surface layers and steel for the inner layer were attached with each other so as to obtain a multilayer ratio of 0.02 to 0.80 and subjected to hot rolling to obtain a hot-rolled steel sheet. Each of the steel for the surface layers and the steel for the inner layer was melted so as to obtain a desired chemical composition to prepare an ingot. The Si content in each of the surface layers $[Si]_0$ was set to 4.5% and the Si content in the inner layer $[Si]_1$ was set to 2.0%. Further, both in each of the surface layers and in the inner layer, the P content was set to 0.05%, the Sn content was set to 0.05%, the Sb content and the content of Al contained as an inevitable impurity were each set to 0.001%. The balance was Fe and inevitable impurities. The surface layers on both surfaces had the same chemical composition.

After the hot rolling, the hot-rolled steel sheet was subjected to hot-rolled sheet annealing of 950° C.×30 s, followed by cold rolling to obtain a cold-rolled steel sheet having a sheet thickness of 0.10 mm. Subsequently, the cold-rolled sheet was subjected to final annealing of 1000° C.×30 s to obtain a multilayer electrical steel sheet.

Figure 5:
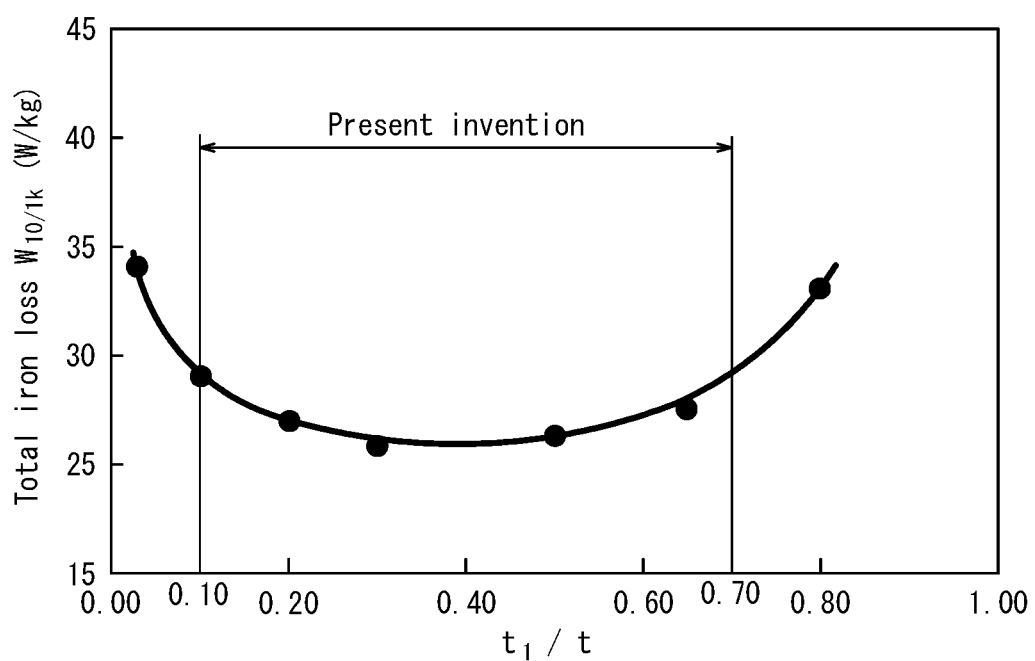
FIG. 5 is a graph illustrating a correlation between the multilayer ratio defined as a ratio of a total thickness of the surface layers $t_1$ to the sheet thickness of the multilayer electrical steel sheet t and the total iron loss ($W_{10/1k}$).

FIG. 5 illustrates a correlation between the multilayer ratio (tilt) and the total iron loss ($W_{10/1k}$). From the result, it is found that when the multilayer ratio is from 0.10 to 0.70, the iron loss is greatly reduced. The reduction in the iron loss is believed to be because of the following reasons. First, since the ratio of the surface layers which have high resistance is low when the multilayer ratio is less than 0.10, the eddy current which concentrates on the surface layers cannot be effectively reduced. On the other hand, since the difference in magnetic permeability between the surface layers and the inner layer is small when the multilayer ratio is more than 0.70, the magnetic flux penetrates to the inner surface and the eddy current loss also occurs from the inner surface. Therefore, the iron loss can be reduced by setting the multilayer ratio in a range of from 0.10 to 0.70. For the above reasons, the multilayer ratio (tilt) in this disclosure is set to 0.10 to 0.70.

[Sheet Thickness]

The sheet thickness of the multilayer electrical steel sheet t is not particularly limited and t may be any value. However, when the multilayer electrical steel sheet is excessively thin, it is difficult to perform cold rolling and annealing in manufacturing the multilayer electrical steel sheet, which may cause an increase in costs. Therefore, from the viewpoint of reducing the manufacturing cost, t is preferably set to 0.03 mm or more. On the other hand, when t is set to 0.3 mm or less, the eddy current loss can be further reduced, and as a result, the total iron loss can be further lowered. Therefore, t is preferably set to 0.3 mm or less.

[Magnetic Flux Density]

$B_{10}$: 1.3 T or More

The multilayer electrical steel sheet of this disclosure has high magnetic flux density. Specifically, the magnetic flux density at a magnetic field intensity of 1000 A/m represented by $B_{10}$ is 1.3 T or more. Increasing the magnetic flux density in the electrical steel sheet is effective for improving the torque of a motor manufactured using the electrical steel sheet. Further, when the magnetic flux density is high, the same torque can be obtained with low current, and as a result, copper loss can be reduced.

$B_1/B_{10}$: 0.45 or More

The ratio of $B_1$ to $B_{10}$ represented by $B_1/B_{10}$ is set to 0.45 or more, where $B_1$ denotes a magnetic flux density at a magnetic field intensity of 100 A/m. By increasing $B_1/B_{10}$, a good rise can be obtained in a magnetization curve in a designed magnetic flux density region used in a small motor. Since this reduces a motor current required to obtain a predetermined torque, the copper loss is reduced and thus, the motor efficiency can be improved.

[Iron Loss]

In this disclosure, the iron loss at a frequency of 1 kHz and a largest magnetic flux density of 1.0 T (total iron loss) $W_{10/1k}$ (W/kg) and the sheet thickness t in mm need to satisfy the following formula (1):

$$W_{10/1k} \leq 15 + 140 \times t \quad (1).$$

The reason is that when the relation of the formula (1) is not satisfied, an extremely large amount of heat is generated in stator cores, significantly lowering the motor efficiency. Since the iron loss depends on the sheet thickness, the upper limit of the iron loss is defined in the formula (1), considering the effect of the sheet thickness.

In the electrical steel sheet, when the magnetic flux density is increased, the iron loss is typically increased. Therefore, common motor cores are designed so that the magnetic flux density is about 1.0 T. On the other hand, the multilayer electrical steel sheet of this disclosure achieves both high magnetic flux density and low iron loss which are conflicting properties by controlling the chemical compositions of the surface layers and the inner layer and the multilayer ratio of the steel sheet as described above.

[Manufacturing Method]

The method of manufacturing the multilayer electrical steel sheet of this disclosure is not particularly limited and may be any method. Examples of the manufacturing method include a method of cladding steel raw materials having different Si contents. The chemical compositions of the steel raw materials can be adjusted by, for example, blowing materials having different compositions in a converter to obtain molten steel and subjecting the molten steel to degassing treatment.

The cladding method is not particularly limited. However, for example, a steel slab for the surface layers and a steel slab for the inner layer each having the chemical composition described above may be prepared and the steel slab for the surface layers may be attached, with a thickness such that the eventual multilayer ratio is a desired value, to both surfaces of the steel slab for the inner layer, followed by rolling. The rolling may be, for example, at least one selected from the group consisting of hot rolling, warm rolling, and cold rolling. In general, the combination of hot rolling and subsequent warm rolling or the combination of hot rolling and subsequent cold rolling is preferable. After the hot rolling, hot-rolled sheet annealing is preferably performed. Further, the warm rolling and cold rolling may be performed twice or more with intermediate annealing performed therebetween. The rolling finish temperature and the coiling temperature during the hot rolling are not particularly limited and may be determined according to the conventional method. After the rolling, final annealing is performed. The multilayer electrical steel sheet obtained by cladding the steel materials having different Si contents has the Si content profile as illustrated in, for example, FIG. 2B.

As another manufacturing method, siliconizing treatment may be used. When the siliconizing treatment is used, by subjecting a steel sheet having a constant Si content in the thickness direction to siliconizing treatment, the Si content in the surface layers on both sides of the steel sheet can be increased. The method of the siliconizing treatment is not particularly limited and may be any method. For example, a method in which Si is deposited on the surfaces of the steel sheet by a chemical vapor deposition method (CVD method) and subsequently heat treatment is performed to diffuse Si to the inside of the steel sheet can be used. The Si contents of the surface layers and the inner layer can be controlled by adjusting the amount of Si deposited by the CVD method and heat treatment conditions. The multilayer electrical steel sheet obtained by the siliconizing treatment has the Si content profile as illustrated in, for example, FIG. 2A.

Examples

To determine the effect of this disclosure, multilayer electrical steel sheets were manufactured in the following procedures and their magnetic properties were evaluated.

First, for each multilayer electrical steel sheet, two types of steel slabs for a surface layer and an inner layer having the chemical compositions listed in Table 1 were prepared. Next, the steel slab for a surface layer was stacked on both sides of the steel slab for an inner layer. The outer periphery of the stacked steel slabs was welded. Therefore, the surface layers on both sides had the same chemical composition. The chemical compositions of the steel slabs were adjusted by blowing the steel slabs in a converter and subsequently subjecting them to degassing treatment. The chemical compositions were maintained in the resulting multilayer electrical steel sheet.

Next, the stacked steel slabs were heated at 1130° C. for 1 hr, and subsequently hot rolled to obtain a hot-rolled steel sheet having a sheet thickness of up to 2.0 mm. The hot rolling finish temperature in the hot rolling was set to 800° C. Then, the hot-rolled steel sheet was coiled at a coiling temperature of 610° C., and then subjected to hot-rolled sheet annealing of 940° C.×30 s. Subsequently, the hot-rolled steel sheet was subjected to pickling and cold rolling, followed by annealing at a final annealing temperature listed in Table 1 to obtain a multilayer electrical steel sheet. The sheet thickness of the resulting multilayer electrical steel sheet t and a ratio of a total thickness of the surface layers $t_1$ to t (i.e., a multilayer ratio) were as listed in Table 2.

For comparison, normal electrical steel sheets without cladding were subjected to the same test (Nos. 1 and 2). These electrical steel sheets as comparative examples had the same chemical composition in the surface layers and the inner layer.

Further, the multilayer electrical steel sheet of No. 33 was manufactured by a siliconizing method. Specifically, a cold-rolled steel sheet having a Si content of 2.0% and a sheet thickness of 0.2 mm was subjected to siliconizing treatment at 1200° C. The average of Si contents over the total sheet thickness of the steel sheet was calculated. A part having a higher Si concentration than the average was defined as a surface layer and a part having a lower Si concentration than the average was defined as an inner layer. The Si content in each of the surface layers was an average of Si contents in the surface layers. Further, listed as the magnetostriction measurements of the surface layers and the inner layer are the magnetostriction measurements of a steel sheet having the same Si content as the average of Si contents and the same chemical composition as that of the multilayer electrical steel sheet of No. 33 except for the Si content.

(Magnetic Properties)

Next, each of the obtained multilayer electrical steel sheets was measured for its magnetic properties. The measurement of the magnetic properties was performed using a 25 cm Epstein frame according to JIS C 2550-1. As the magnetic properties, the iron loss at 1.0 T and 1 kHz represented by $W_{10/1k}$ (W/kg), the magnetic flux density at a magnetic field intensity of 1000 A/m represented by $B_{10}$, and the magnetic flux density at a magnetic field intensity of 100 A/m represented by $B_1$ were measured. The measurement results are as listed in Table 2.

As can be seen from the results of Tables 1 and 2, the multilayer electrical steel sheets of our examples satisfying the conditions of this disclosure had excellent properties, i.e., low high-frequency iron loss and high magnetic flux density. Therefore, the multilayer electrical steel sheets according to this disclosure can be extremely suitably used as motor cores of hybrid electric vehicles, electric vehicles, cleaners, high speed power generators, air compressors, machine tools, and the like which are driven at high frequencies, and further as core materials of transformers, reactors, and the like.

TABLE 1

| | Chemical composition (mass %) | | | | | | | | | | | | | | |
|---|---|---|---|---|---|---|---|---|---|---|---|---|---|---|---|
| | Surface layer* | | | | | | Inner layer* | | | | | | | | |
| No. | Si | Al | P | Sn | Sb | Mo | Si | Al | P | Sn | Sb | Mo | ΔSi | ΔAl |
| 1 | 2.5 | 0.0010 | 0.05 | 0.0010 | 0.0010 | 0.0010 | 2.5 | 0.0010 | 0.05 | 0.0010 | 0.0010 | 0.0010 | <u>0.00</u> | 0.0000 |
| 2 | 5.5 | 0.0010 | 0.01 | 0.0400 | 0.0010 | 0.0010 | <u>5.5</u> | 0.0010 | 0.01 | 0.0400 | 0.0010 | 0.0010 | <u>0.00</u> | 0.0000 |
| 3 | 4.0 | 0.0010 | 0.04 | 0.0010 | 0.0010 | 0.0010 | 2.4 | 0.0005 | 0.04 | 0.0010 | 0.0010 | — | 1.60 | 0.0005 |
| 4 | 4.2 | 0.0010 | 0.04 | 0.0400 | 0.0010 | 0.0010 | 2.0 | 0.0010 | 0.04 | 0.0400 | 0.0010 | — | 2.20 | 0.0000 |
| 5 | 4.7 | 0.0010 | 0.01 | 0.0600 | 0.0200 | 0.0010 | 2.5 | 0.0010 | 0.01 | 0.0600 | 0.0200 | — | 2.20 | 0.0000 |
| 6 | 6.0 | 0.0020 | 0.03 | 0.0010 | 0.0010 | 0.0010 | 1.7 | 0.0010 | 0.03 | 0.0010 | 0.0010 | 0.0010 | <u>4.30</u> | 0.0010 |
| 7 | 4.0 | 0.0025 | 0.07 | 0.0300 | 0.0010 | 0.0010 | <u>1.2</u> | 0.0010 | 0.07 | 0.0300 | 0.0010 | 0.0010 | 2.80 | 0.0015 |
| 8 | 4.0 | 0.0030 | — | — | — | 0.0010 | 2.0 | 0.0030 | — | — | — | 0.0010 | 2.00 | 0.0000 |
| 9 | 4.3 | 0.0010 | 0.06 | 0.0400 | 0.0010 | 0.0010 | 1.9 | 0.0010 | 0.06 | 0.0400 | 0.0010 | 0.0012 | 2.40 | 0.0000 |
| 10 | 4.3 | 0.0010 | 0.01 | 0.0400 | 0.0300 | 0.0010 | 1.9 | 0.0010 | 0.01 | 0.0400 | 0.0300 | 0.0010 | 2.40 | 0.0000 |
| 11 | 4.3 | 0.0010 | 0.01 | 0.0010 | 0.0800 | 0.0010 | 1.9 | 0.0010 | 0.01 | 0.0010 | 0.0800 | 0.0010 | 2.40 | 0.0000 |
| 12 | 4.3 | 0.0010 | 0.05 | 0.0400 | 0.0010 | 0.0100 | 1.9 | 0.0010 | 0.05 | 0.0400 | 0.0010 | 0.0100 | 2.40 | 0.0000 |
| 13 | 4.5 | 0.0010 | 0.03 | 0.0300 | 0.0010 | 0.0010 | 2.1 | 0.0010 | 0.03 | 0.0300 | 0.0010 | — | 2.40 | 0.0000 |
| 14 | 4.5 | 0.0010 | 0.03 | 0.0300 | 0.0010 | 0.0010 | 2.1 | 0.0010 | 0.03 | 0.0300 | 0.0010 | — | 2.40 | 0.0000 |
| 15 | 4.5 | 0.0010 | 0.03 | 0.0300 | 0.0010 | 0.0010 | 2.1 | 0.0010 | 0.03 | 0.0300 | 0.0010 | — | 2.40 | 0.0000 |
| 16 | 4.5 | 0.0010 | 0.03 | 0.0300 | 0.0010 | 0.0010 | 2.1 | 0.0010 | 0.03 | 0.0300 | 0.0010 | 0.0010 | 2.40 | 0.0000 |
| 17 | 4.2 | 0.0024 | 0.04 | 0.0400 | 0.0010 | 0.0030 | 2.2 | 0.0010 | 0.04 | 0.0400 | 0.0010 | 0.0030 | 2.00 | 0.0014 |
| 18 | 4.2 | 0.0600 | 0.04 | 0.0400 | 0.0010 | 0.0030 | 2.2 | 0.0010 | 0.04 | 0.0400 | 0.0010 | 0.0030 | 2.00 | 0.0590 |
| 19 | 4.1 | 0.0010 | 0.05 | 0.0400 | 0.0010 | 0.0010 | 2.5 | 0.0020 | 0.05 | 0.0400 | 0.0010 | — | 1.60 | 0.0010 |
| 20 | 4.1 | 0.0010 | 0.01 | 0.0600 | 0.0010 | 0.0010 | 2.5 | 0.0020 | 0.01 | 0.0600 | 0.0010 | — | 1.60 | 0.0010 |
| 21 | 4.1 | 0.0010 | 0.05 | 0.0400 | 0.0010 | 0.0010 | 2.5 | 0.0020 | 0.05 | 0.0400 | 0.0010 | — | 1.60 | 0.0010 |
| 22 | 4.1 | 0.0010 | 0.05 | 0.0010 | 0.0400 | 0.0010 | 2.5 | 0.0020 | 0.05 | 0.0010 | 0.0400 | — | 1.60 | 0.0010 |
| 23 | 4.3 | 0.0010 | 0.01 | 0.0400 | 0.0300 | 0.0010 | 1.9 | 0.0020 | 0.01 | 0.0400 | 0.0300 | — | 2.40 | 0.0010 |
| 24 | 4.3 | 0.0010 | 0.01 | 0.0600 | 0.0010 | 0.0010 | 1.9 | 0.0020 | 0.01 | 0.0600 | 0.0010 | — | 2.40 | 0.0010 |
| 25 | 4.3 | 0.0010 | 0.01 | 0.0010 | 0.0700 | 0.0010 | 1.9 | 0.0020 | 0.01 | 0.0010 | 0.0700 | — | 2.40 | 0.0010 |
| 26 | 4.3 | 0.0010 | 0.01 | 0.0400 | 0.0400 | 0.0010 | 1.9 | 0.0020 | 0.01 | 0.0400 | 0.0400 | — | 2.40 | 0.0010 |
| 27 | 4.2 | 0.0010 | 0.06 | — | — | — | 2.4 | 0.0010 | 0.06 | — | — | — | 1.80 | 0.0000 |
| 28 | 4.2 | 0.0010 | — | 0.0500 | — | — | 2.4 | 0.0010 | — | 0.0500 | — | — | 1.80 | 0.0000 |
| 29 | 4.2 | 0.0010 | — | — | 0.0500 | — | 2.4 | 0.0010 | — | — | 0.0500 | — | 1.80 | 0.0000 |
| 30 | 4.2 | 0.0010 | 0.05 | 0.0500 | — | — | 2.4 | 0.0010 | 0.05 | 0.0500 | — | — | 1.80 | 0.0000 |
| 31 | 5.8 | 0.0010 | 0.04 | — | — | — | 3.5 | 0.0010 | 0.04 | — | — | — | 2.30 | 0.0000 |
| 32 | 3.2 | 0.0010 | — | 0.0400 | — | — | 2.0 | 0.0010 | — | 0.0400 | — | — | 1.20 | 0.0000 |
| 33 | 4.5 | 0.0010 | 0.05 | 0.0500 | — | — | 2.0 | 0.0010 | 0.05 | 0.0500 | — | — | 2.50 | 0.0000 |

*The balance is Fe and inevitable impurities.

TABLE 2

| | | | Final | | Magnetic properties | | | | | |
|---|---|---|---|---|---|---|---|---|---|---|
| No. | Sheet thickness t (mm) | Multilayer ratio $t_1/t$ | annealing temperature (° C.) | 15 + 140t | $W_{10/1k}$ (W/kg) | Conditions of formula (1) | $B_1$ (T) | $B_{10}$ (T) | $B_1/B_{10}$ | Remarks |
| 1 | 0.20 | — | 1000 | 43 | 44.0 | <u>unsatisfied</u> | 1.10 | 1.51 | 0.73 | Comparative Example |
| 2 | 0.20 | — | 1000 | 43 | 38.0 | satisfied | 1.07 | <u>1.25</u> | 0.86 | Comparative Example |
| 3 | 0.25 | 0.30 | 1020 | 50 | 44.0 | satisfied | 1.10 | 1.48 | 0.74 | Example |
| 4 | 0.20 | 0.30 | 1000 | 43 | 37.5 | satisfied | 1.15 | 1.45 | 0.79 | Example |
| 5 | 0.20 | 0.30 | 1000 | 43 | 37.2 | satisfied | 1.02 | 1.44 | 0.71 | Example |
| 6 | 0.20 | 0.30 | 1050 | 43 | 44.0 | <u>unsatisfied</u> | 0.65 | <u>1.24</u> | 0.52 | Comparative Example |
| 7 | 0.15 | 0.30 | 1150 | 36 | 40.0 | <u>unsatisfied</u> | 1.15 | 1.54 | 0.75 | Comparative Example |
| 8 | 0.25 | 0.30 | 1000 | 50 | 51.0 | <u>unsatisfied</u> | 0.95 | <u>1.25</u> | 0.76 | Comparative Example |

TABLE 2-continued

| No. | Sheet thickness t (mm) | Multilayer ratio $t_1/t$ | Final annealing temperature (° C.) | Magnetic properties | | | | | | |
|---|---|---|---|---|---|---|---|---|---|---|
| | | | | 15 + 140t | $W_{10/1k}$ (W/kg) | Conditions of formula (1) | $B_1$ (T) | $B_{10}$ (T) | $B_1/B_{10}$ | Remarks |
| 9  | 0.20 | 0.30 | 1000 | 43 | 38.0 | satisfied   | 1.15 | 1.50 | 0.77 | Example |
| 10 | 0.15 | 0.30 | 1000 | 36 | 33.5 | satisfied   | 1.12 | 1.45 | 0.77 | Example |
| 11 | 0.10 | 0.30 | 1000 | 29 | 27.5 | satisfied   | 1.08 | 1.43 | 0.76 | Example |
| 12 | 0.10 | 0.30 | 1000 | 29 | 26.5 | satisfied   | 1.10 | 1.43 | 0.77 | Example |
| 13 | 0.20 | 0.30 | 1000 | 43 | 36.8 | satisfied   | 1.08 | 1.47 | 0.73 | Example |
| 14 | 0.20 | 0.15 | 1000 | 43 | 39.8 | satisfied   | 1.10 | 1.49 | 0.74 | Example |
| 15 | 0.20 | 0.50 | 1000 | 43 | 36.5 | satisfied   | 1.08 | 1.44 | 0.75 | Example |
| 16 | 0.20 | 0.80 | 1000 | 43 | 44.5 | unsatisfied | 1.05 | 1.39 | 0.76 | Comparative Example |
| 17 | 0.20 | 0.30 | 980  | 43 | 38.5 | satisfied   | 1.10 | 1.49 | 0.74 | Example |
| 18 | 0.20 | 0.30 | 980  | 43 | 45.0 | unsatisfied | 0.87 | 1.24 | 0.70 | Comparative Example |
| 19 | 0.25 | 0.40 | 1100 | 50 | 44.0 | satisfied   | 1.10 | 1.48 | 0.74 | Example |
| 20 | 0.20 | 0.40 | 1100 | 43 | 37.0 | satisfied   | 1.08 | 1.45 | 0.74 | Example |
| 21 | 0.10 | 0.40 | 1100 | 29 | 27.0 | satisfied   | 1.08 | 1.45 | 0.74 | Example |
| 22 | 0.08 | 0.40 | 1100 | 26 | 24.0 | satisfied   | 1.04 | 1.41 | 0.74 | Example |
| 23 | 0.20 | 0.40 | 1050 | 43 | 37.2 | satisfied   | 1.08 | 1.44 | 0.75 | Example |
| 24 | 0.10 | 0.40 | 1050 | 29 | 27.4 | satisfied   | 1.08 | 1.43 | 0.76 | Example |
| 25 | 0.08 | 0.40 | 1050 | 26 | 25.1 | satisfied   | 1.04 | 1.40 | 0.74 | Example |
| 26 | 0.06 | 0.40 | 1050 | 23 | 22.1 | satisfied   | 1.01 | 1.40 | 0.72 | Example |
| 27 | 0.20 | 0.50 | 1050 | 43 | 38.0 | satisfied   | 1.10 | 1.48 | 0.74 | Example |
| 28 | 0.20 | 0.50 | 1050 | 43 | 38.5 | satisfied   | 1.10 | 1.48 | 0.74 | Example |
| 29 | 0.20 | 0.50 | 1050 | 43 | 38.2 | satisfied   | 1.10 | 1.48 | 0.74 | Example |
| 30 | 0.20 | 0.50 | 1050 | 43 | 37.5 | satisfied   | 1.10 | 1.48 | 0.74 | Example |
| 31 | 0.20 | 0.50 | 1050 | 43 | 40.0 | satisfied   | 1.01 | 1.32 | 0.77 | Example |
| 32 | 0.20 | 0.50 | 1050 | 43 | 40.5 | satisfied   | 1.10 | 1.45 | 0.76 | Example |
| 33 | 0.20 | 0.50 | 1200 | 43 | 37.5 | satisfied   | 1.10 | 1.45 | 0.76 | Example |

REFERENCE SIGNS LIST

1 Multilayer electrical steel sheet
10 Inner layer
20 Surface layer

The invention claimed is:

1. A multilayer electrical steel sheet comprising an inner layer and surface layers provided on both sides of the inner layer, wherein the multilayer electrical steel sheet is a clad steel sheet obtained by cladding steel materials having different Si contents, each of the surface layers has a chemical composition containing, in mass %,
Si: 2.5% to 6.0% and
at least one selected from the group consisting of P: 0.01% to 0.1%, Sn: 0.001% to 0.1% and Sb: 0.001% to 0.1%, with the balance being Fe and inevitable impurities, the inner layer has a chemical composition containing, in mass %,
Si: 1.5% to 4.0% and
at least one selected from the group consisting of P: 0.01% to 0.1%, Sn: 0.001% to 0.1% and Sb: 0.001% to 0.1%, with the balance being Fe and inevitable impurities, and the multilayer electrical steel sheet has:

$\Delta$Si of 0.5 mass % to 4.0 mass %, $\Delta$Si being defined as a difference between a Si content in each of the surface layers $[Si]_1$ and a Si content in the inner layer $[Si]_0$ represented by $[Si]_1 - [Si]_0$;

$\Delta$Al of 0.05 mass % or less, $\Delta$Al being defined as an absolute value of a difference between a content of Al contained as an inevitable impurity in each of the surface layers $[Al]_1$ and a content of Al contained as an inevitable impurity in the inner layer $[Al]_0$ represented by $|[Al]_1 - [Al]_0|$;

a ratio of $t_1$ to t represented by $t_1/t$ of from 0.10 to 0.70, where $t_1$ denotes a total thickness of the surface layers and t denotes a sheet thickness of the multilayer electric steel sheet;

$B_{10}$ of 1.3 T or more, where $B_{10}$ denotes a magnetic flux density at a magnetic field intensity of 1000 A/m;

a ratio of $B_1$ to $B_{10}$ represented by $B_1/B_{10}$ of 0.45 or more, where $B_1$ denotes a magnetic flux density at a magnetic field intensity of 100 A/m; and an iron loss at a frequency of 1 kHz and a largest magnetic flux density of 1.0 T represented by $W_{10/1k}$ in W/kg and the sheet thickness t in mm satisfy the following formula (1):

$$W_{10/1k} \leq 15 + 140 \times t \qquad (1).$$

2. The multilayer electrical steel sheet according to claim 1, wherein at least one of the chemical composition of each of the surface layers or the chemical composition of the inner layer further contains, in mass %, Mo: 0.001% to 0.1%.

* * * * *